Patented Aug. 17, 1954

2,686,784

UNITED STATES PATENT OFFICE 2,686,784

PIPERIDINE DERIVATIVES

Jacob Finkelstein, East Paterson, and John Lee, Essex Fells, N. J., assignors to Hoffmann-La Roche Inc., Nutley, N. J., a corporation of New Jersey No Drawing. Application July 15, 1950, Serial No. 174,116

14 Claims. (Cl. 260—293)

This invention relates to new chemical compounds which can be described broadly as piperidine derivatives. More specifically, the compounds of the invention can be described as dialkylaminophenethyl-piperidine bases and their salts. The piperidine bases and their salts are useful in the field of therapeutics, and are especially of interest in the field of trichomonal and amoebic infections.

More particularly, the piperidine bases of the invention are those of the class consisting of 1-alkyl -2 - (dialkylaminophenethyl) - piperidines and 1-alkyl-4-(dialkylaminophenethyl)-piperidines; that is, compounds which can be considered as structurally derived from piperidine by substitution of an alkyl radical in the 1-position and of a dialkylaminophenethyl radical in either the 2- or the 4-position thereof, the piperidine being otherwise unsubstituted. The alkyl groups can be the same or different. The following compounds can be instanced as illustrative of these piperidines: 1-ethyl-2-(4-di-n-hexylaminophenethyl)-piperidine, 1-n-hexyl-2-(4-di-n-hexylaminophenethyl)-piperidine, 1-n-hexyl - 4 - (4 - di - n - hexylaminophenethyl) - piperidine, 1-methyl-2-(3-diethylaminophenethyl)-piperidine and 1-methyl-2-(2-diethylaminophenethyl)-piperidine. The compounds of the invention can be represented by the following general Formulae I and II, wherein $R^1$, $R^2$, and $R^3$ each represents an alkyl group:

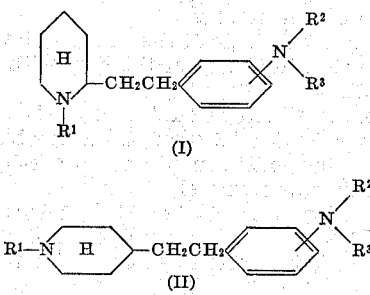

The salts of the invention embrace the acid addition salts of the above piperidines with inorganic and organic acids, and particularly with non-toxic acids, such as hydrochloric, hydrobromic, sulfuric, phosphoric acetic, maleic, and tartaric acids, and the like, as well as quaternary salts of these piperidines, particularly those formed from such quaternizing agents as are nontoxic, e. g. methyl bromide, ethyl iodide, benzyl chloride, methyl-p-toluenesulfonate, and the like.

The piperidine bases can be prepared by a process comprising reacting an alkyl halide quaternary salt of a methyl-substituted pyridine (e. g. α-picoline methiodide or γ-picoline n-hexyl bromide) with an aminobenzaldehyde to form a 1-alkyl-2(or 4)-aminostyryl-pyridinium salt, and catalytically reducing the latter to form an acid addition salt of a 1-alkyl-2(or 4)-aminophenethyl-piperidine. The free 1-alkyl-2(or 4)-aminophenethyl-piperidine base can be liberated from the latter salt by alkalinization, and can then be converted to any desired acid addition salt or quaternary salt by treatment with the appropriate acid or organic quaternizing agent, respectively. If the amino group in the benzaldehyde used as starting material is not already alkylated, alkyl groups can be introduced into the condensation product, i. e. into the aminophenethyl-piperidine base, by reacting the base with appropriate alkylating agents.

The invention is further disclosed in the following examples, which are illustrative but not limitative thereof:

EXAMPLE 1

1-methyl-2-4-dimethylaminophenethyl)-piperidine 9.3 g. of α-picoline was mixed with 14.2 g. of methyl iodide and allowed to react spontaneously. The resulting white solid, 1,2-dimethyl-pyridinium iodide (α-picoline methiodide), was taken up in 270 cc. of ethanol, and to the reaction mixture were added 15 g. of p-dimethylaminobenzaldehyde and 4 cc. of piperidine. The reaction mixture was refluxed for about 5 hours. At the end of this time, it was cooled and the precipitate was filtered off and recrystallized from methanol. The resulting material was 1-methyl - 2 - (4 - dimethylaminostyryl) - pyridinium iodide, M. P. approximately 260° C. with decomposition.

9.6 g. of the latter compound was suspended in 150 cc. of 95 per cent ethanol and hydrogenated at 50°–60° C. under 100 lbs. hydrogen pressure in the presence of 200 mg. of platinum dioxide. The reaction mixture was filtered to separate the catalyst, concentrated and cooled. The crystalline precipitate was separated and recrystallized from alcohol to yield a product having a melting point of approximately 182°–183° C., which was 1-methyl-2-(4-dimethylaminophenethyl)-piperidine monohydriodide.

The free base was obtained by adding to a suspension of 100 g. of the above hydriodide in 150 cc. of water sufficient strong sodium hydroxide to make the solution alkaline. The resulting oil was taken up in ether, the ethereal extract was dried over potassium hydroxide and concentrated. The residue was submitted to fractionation under reduced pressure, yielding a colorless oil, B. P. approximately 157°–158° C. at 1 mm. Hg. This product was 1-methyl-2-(4-dimethylaminophenethyl)-piperidine.

To 3 g. of the above oil, dissolved in dry ether, alcoholic hydrogen chloride was added. The mixture was cooled and the crystalline precipitate filtered off and recrystallized from an alcohol-ether mixture, and dried in vacuo at 100° C. over phosphorus pentoxide; M. P. approximately 176°–178° C. with decomposition. This material was 1-methyl-2-(4-dimethylaminophenethyl)-piperidine dihydrochloride.

3 g. of the free base 1-methyl-2-(4-dimethylaminophenethyl)-piperidine was reacted with an excess of an acetone solution of methyl bromide. The reaction mixture was cooled, the solid material was filtered off, and washed with acetone. The resulting product was recrystallized and dried. It was 1,1-dimethyl-2-(4-dimethylaminophenethyl)-piperidinium bromide, M. P. approximately 234°–236° C.

10 g. of 1-methyl-2-(4-dimethylaminophenethyl)-piperidine and 15 g. of ethyl iodide were heated on the steam bath for 3 hours. The resulting crystalline product was recrystallized from alcohol. It was 1-methyl-1-ethyl-2-(4-dimethylaminophenethyl)-piperidinium iodide, M. P. approximately 202°–204° C. with decomposition.

2.6 g. of 1-methyl-2-(4-dimethylaminophenethyl)-piperidine was mixed with 1.3 g. of benzyl chloride and 50 cc. of dry xylene. The reaction mixture was refluxed for 4½ hours, and then concentrated in vacuo. The residue was triturated with ether and filtered. The precipitate was recrystallized from alcohol to give a product melting at approximately 211°–212° C., which was 1-methyl-1-benzyl-2-(4-dimethylaminophenethyl)-piperidinium chloride.

EXAMPLE 2

1 - methyl - 2 - (4 - diethylaminophenethyl)-piperidine 46.5 g. of α-picoline was allowed to react with 71 g. of methyl iodide. To the reaction mixture were added 500 cc. of ethanol, 90 g. of p-diethylaminobenzaldehyde and 10 cc. of piperidine. The reaction mixture was refluxed for 6 hours, cooled and filtered. The crystalline product, 1-methyl-2 - (4 - diethylaminostyryl) - pyridinium iodide, after drying at 100° C. in vacuo, melted at approximately 230°–232° C.

To 100 g. of 1-methyl-2-(4-diethylaminostyryl)-pyridinium iodide, prepared as described above, were added 1400 cc. of 95 per cent ethyl alcohol, and 300 mg. of platinum dioxide. The reaction mixture was maintained at 50° C. and hydrogenated under a hydrogen pressure of 150 lbs. After completion of the hydrogenation, the reaction mixture was cooled and filtered, and to the filtrate was added 250 cc. of 1 N NaOH. The reaction mixture was concentrated on the steam bath, and the oil which separated was extracted with chloroform. The chloroform extract was washed with water, dried and concentrated. The residual oil was fractionated in vacuo to give a product having a boiling point of approximately 175° C. at 2 mm. Hg. This product was 1-methyl-2-(4-diethylaminophenethyl)-piperidine.

1 - methyl - 2 - (4 - diethylaminophenethyl) - piperidine dihydrochloride, M. P. approximately 197°–199° C., was prepared by passing dry hydrogen chloride into an ethereal solution of the base, filtering, and recrystallizing from butanol-ether.

The methyl bromide quaternary salt was prepared as in Example 1 by adding an excess of an acetone solution of methyl bromide to the free base. The product, 1,1-dimethyl-2-(4-diethylaminophenethyl)-piperidinium bromide, melted at approximately 224°–226° C.

A di-quaternary salt with ethyl iodide was prepared by heating 21 g. of the free base with 30 g. of ethyl iodide in 50 cc. of alcohol at 125° C. for approximately 5 hours. The solution was cooled and allowed to stand and the resulting crystalline product, 1-methyl-2-(4-diethylaminophenethyl)-piperidine di-ethiodide, was filtered off; M. P. approximately 202°–206° C.

EXAMPLE 3

1-ethyl-2-(4-diethylaminophenethyl)-piperidine 100 g. of ethyl iodide was mixed with 62 g. of α-picoline. Slight warming started the reaction which then continued spontaneously until the entire reaction mixture was solid. To 40 g. of 1-ethyl-2-methyl-pyridinium iodide, thus prepared, were added 100 cc. of 95 per cent ethanol, 28.4 g. of p-diethylaminobenzaldehyde and 2 cc. of piperidine. The reaction mixture was refluxed for 6 hours. Then it was cooled to room temperature, the resulting crystals were filtered off, recrystallized from alcohol, and dried. The product was 1 - ethyl - 2 - (4 - diethylaminostyryl)-pyridinium iodide, M. P. approximately 195°–196° C.

35.5 g. of 1-ethyl-2-(4-diethylaminostyryl)-pyridinium iodide was suspended in 800 cc. of 95 per cent alcohol, and reduced at 50° C. under 100 lbs. hydrogen pressure in the presence of platinum dioxide, as described above. When the hydrogenation was completed, the reaction mixture was cooled and the catalyst was filtered off, and to the filtrate was added 100 cc. of 1 N NaOH. Then the alcohol was distilled off, the residue was extracted with ether and the ethereal extract was dried. Upon concentration of the extract, an oil was obtained which was fractioned to obtain a product, 1-ethyl-2-(4-diethylaminophenethyl)-piperidine, having a B. P. of approximately 184°–186° C. at 4 mm. Hg.

The dihydrochloride of the above base was prepared by reacting 7.0 g. of the base with 48.5 cc. of 1 N HCl.

The mono-ethiodide quaternary salt was prepared by refluxing 28 g. of the above base with 50 g. of ethyl iodide in 200 cc. of methyl ethyl ketone for approximately 12 hours. After recrystallization from alcohol, the product, 1,1-diethyl - 2 - (4 - diethylaminophenethyl) - piperidinium iodide, melted at approximately 194°–197° C.

EXAMPLE 4

1-methyl-2-(3-aminophenethyl)-piperidine

To 23.5 g. of α-picoline methiodide, prepared as described in Example 1, were added 15.1 g. of m-nitrobenzaldehyde, 125 cc. of ethanol and 3 cc. of piperidine. The reaction mixture was refluxed for about 6 hours, cooled, and the crystalline material filtered off, washed with alcohol and dried on a steam bath. After recrystallization from water the product melted at approximately 248°–

250° C. It was 1-methyl-2-(3-nitrostyryl)-pyridinium iodide.

74. g. of the above product was dissolved in 800 cc. of 95 per cent alcohol and reduced with hydrogen in the presence of platinum dioxide at 50° C. and under a hydrogen pressure of 200 lbs., as described in Example 1. The catalyst was filtered off, and to the filtrate was added 220 cc. of 1 N NaOH. The reaction mixture was concentrated by removing the solvent, and the resulting oil was taken up in ether. The ether solution was washed with water and dried over potassium carbonate and then distilled under reduced pressure to give a product having a B. P. of approximately 138°–144° C., which was 1-methyl-2-(3-aminophenethyl)-piperidine.

A monohydrochloride of the above base was prepared by reacting 21 g. of the free base with approximately 96 cc. of 1 N HCl.

EXAMPLE 5

*1 - methyl - 2 - (3 - diethylaminophenethyl) - piperidine*

47 g. of 1-methyl-2-(3-aminophenethyl)-piperidine (Example 4) was mixed with 30 g. of triethyl phosphate and refluxed for two hours. Then the reaction mixture was cooled and 115 cc. of 30 per cent NaOH was added, and the reaction mixture was again refluxed for 1½ hours. At the end of this time, the reaction mixture was cooled, poured into water, and the aqueous mixture was extracted with ether. The ether extract was washed with water, dried and concentrated. The residue was fractionated under reduced pressure. The fraction boiling at approximately 174°–180° C. at 3 mm. Hg was 1-methyl-2-(3-diethylaminophenethyl)-piperidine.

The dihydrochloride of the latter compound was prepared by reacting approximately 10 g. of the free base with approximately 73 cc. of 1 N HCl.

EXAMPLE 6

*1-n-hexyl-2-(4-diethylaminophenethyl)-piperidine*

93 g. of α-picoline was mixed with 165 g. of n-hexyl bromide and heated at 135°–140° C. for 24 hours. After standing for an hour, the reaction mixture was extracted alternately with several portions of ether and petroleum ether. The extracts were discarded and the insoluble oil was allowed to stand at 0° C. for about 15 hours to crystallize. The crystals were filtered off, and washed with ether and petroleum ether. The compound was 1-n-hexyl-2-methyl-pyridinium bromide.

To 25.8 g. of the latter quaternary salt were added 17.7 g. of p-diethylaminobenzaldehyde, 100 cc. of alcohol and 5 cc. of piperidine. The reaction mixture was refluxed on a steam bath for 13 hours. Then the reaction mixture was concentrated and the product was filtered off and recrystallized from isopropyl alcohol. It was 1-n-hexyl-2-(4-diethylaminostyryl)-pyridinium bromide, M. P. approximately 216°–217° C.

110 g. of the latter product in 1000 cc. of 95 per cent alcohol was hydrogenated at 50° C. under 200 lbs. hydrogen pressure in the presence of platinum dioxide. The reaction mixture was filtered, alkalinized and worked up as described in Examples 2 to 4, and yielded a product having a B. P. of approximately 199°–201° C. at 1 mm. Hg, which was 1-n-hexyl-2-(4-diethylaminophenethyl)-piperidine.

The dihydrochloride was prepared by reacting 10 g. of the above base with 58 cc. of 1 N HCl.

EXAMPLE 7

*1-n-hexyl-2-(4-dihexylaminophenethyl)-piperidine*

153.5 g. of phosphorus oxychloride was added slowly, while stirring and keeping the temperature at 5°–15° C., to 135 g. of N-methylformanilide. The reaction mixture was stirred at room temperature for 1¼ hours. Then it was cooled, and 130.5 g. of di-n-hexyl-aniline was added while keeping the temperature at 5°–15° C. The reaction mixture was heated at 60°–70° C. for 2½ hours, then poured into a mixture of ice and water. Two layers, an aqueous layer and an oily layer, were formed. The oil layer was separated, taken up in benzene, and the benzene extract was washed with alkali and then with water. The solvent was removed, and the residual oil fractioned under reduced pressure. The fraction boiling at approximately 205°–207° C. under 2 mm. Hg was p-di-n-hexylaminobenzaldehyde.

A mixture of 36.6 g. of 1-n-hexyl-2-methyl-pyridinium bromide (Example 6), 41 g. of p-di-n-hexylaminobenzaldehyde, 40 g. of ethanol and 5 cc. of piperidine was refluxed for 2 hours. The crystalline product was filtered off and recrystallized from isopropanol; M. P. approximately 224°–227° C. It was 1-n-hexyl-2-(4-di-n-hexylaminostyryl)-pyridinium bromide.

44 g. of 1-n-hexyl-2-(4-di-n-hexylaminostyryl)-pyridinium bromide was reduced in 500 cc. of 95 per cent alcohol at 50° C. and under 200 lbs. hydrogen pressure, in the presence of platinum dioxide. The free base was isolated in the manner described in Examples 2 to 4. The product, having a B. P. of approximately 252°–256° C. at 1 mm. Hg, was 1-n-hexyl-2-(4-di-n-hexylaminophenethyl)-piperidine.

The dihydrochloride was prepared by reacting 15 g. of the free base with 65 cc. of 1 N HCl.

EXAMPLE 8

*1-ethyl-2-(4-di-n-hexylaminophenethyl)-piperidine*

A mixture of 17.8 g. of 1-ethyl-2-methyl-pyridinium iodide (Example 3), 20.7 g. of p-di-n-hexylaminobenzaldehyde (Example 7), 20 cc. of alcohol and 5 cc. of piperidine was refluxed for 6½ hours. The reaction mixture was cooled and the resulting precipitate was filtered off and recrystallized from isopropanol, yielding 1-ethyl-2-(4-di-n-hexylaminostyryl)-pyridinium iodide, M. P. approximately 216°–217° C.

25 g. of the latter compound in 200 cc. of 95 per cent alcohol was subjected to hydrogenation at 50° C. under 200 lbs. pressure of hydrogen in the presence of platinum dioxide. The hydrogenation product was isolated in the manner described in Examples 2 to 4. It was 1-ethyl-2-(4-di-n-hexylaminophenethyl)-piperidine, B. P. approximately 240°–241° C. at 8 mm. Hg.

The corresponding dihydrochloride was prepared by treating approximately 10 g. of the free base with 50 cc. of 1 N HCl.

EXAMPLE 9

*1-methyl-4-(4-dimethylaminophenethyl)-piperidine*

47 g. of 1,4-dimethyl-pyridinium iodide (γ-picoline methiodide), prepared by the spontaneous reaction between equivalent amounts of γ-picoline and methyl iodide, was mixed with 30 g.

of p-dimethylaminobenzaldehyde, 250 cc. of ethanol, and 4 cc. of piperidine. The reaction mixture was refluxed for 1 hour. The product isolated was 1-methyl-4-(4-dimethylaminostyryl)-pyridinium iodide.

66 g. of the latter compound in 1000 cc. of 95 per cent alcohol was reduced by catalytic hydrogenation in the presence of platinum oxide in the usual manner. The product, 1-methyl-4-(4-dimethylaminophenethyl)-piperidine, had a B. P. of approximately 150°-156° C. at approximately 1 mm. Hg.

5 g. of the latter compound was reacted with an excess of an acetone solution of methyl bromide. The resulting product, 1,1-dimethyl-4-(4-dimethylaminophenethyl)-piperidinium bromide, had a M. P. of approximately 245°-251° C.

The benzyl bromide quaternary salt was prepared by mixing 5 g. of the free base with an excess of benzyl bromide in benzene. The product was 1-methyl-1-benzyl-4-(4-dimethylaminophenethyl)-piperidinium bromide.

EXAMPLE 10

*1-methyl-4-(4-diethylaminophenethyl)-piperidine*

93 g. of γ-picoline was reacted with 142 g. of methyl iodide. To the γ-picoline methiodide so formed were added 600 cc. of methanol, 250 g. of p-diethylaminobenzaldehyde, and 20 cc. of piperidine. The reaction mixture was refluxed for 5 hours. The product was 1-methyl-4-(4-diethylaminostyryl)-pyridinium iodide, m. p. approximately 217°-220° C.

253 g. of the latter product in 1100 cc. of 95 per cent alcohol was subjected to catalytic hydrogenation at 50° C. under 200 lbs. hydrogen pressure in the presence of 300 mg. of platinum dioxide. The product was isolated as described in Examples 2 to 4, by alkalinization and extraction of the reaction mixture. The product, 1-methyl-4-(4-diethylaminophenethyl)-piperidine, had a B. P. of approximately 165-170° C. at 1 mm. Hg.

The dihydrochloride was prepared by treating approximately 15 g. of the free base with approximately 110 cc. of 1 N HCl.

By reacting the free base with an excess of an acetone solution of methyl bromide, the quaternary salt 1,1-dimethyl-4-(4-diethylaminophenethyl)-piperidinium bromide, M. P. approximately 232°-235° C., was prepared.

EXAMPLE 11

*1-ethyl-4-(4-diethylaminophenethyl)-piperidine*

93 g. of γ-picoline was mixed with 156 g. of ethyl iodide in benzene and refluxed. After 2 hours, the reaction was stopped and the reaction mixture was cooled. The precipitate of the product, 1-ethyl-4-methyl-pyridinium iodide, was filtered off.

125 g. of the latter product, 87 g. of p-diethylaminobenzaldehyde, 300 cc. of ethanol and 10 cc. of piperidine were refluxed for 5 hours. The product, 1-ethyl-4-(4-diethylaminostyryl)-pyridinium iodide, had a M. P. of approximately 200°-205° C.

80 g. of the latter product in 700 cc. of 95 per cent alcohol was reduced at 50° C. and 200 lbs. hydrogen pressure in the presence of platinum dioxide. The product, 1-ethyl-4-(4-diethylaminophenethyl)-piperidine, was obtained by alkalinization of the reaction mixture, extraction with benzene, and isolation of the product under reduced pressure. It had a B. P. of approximately 163°-165° C. at 1 mm. Hg.

The dihydrochloride was prepared by reacting 10 g. of the free base with approximately 70 cc. of 1 N HCl.

By reacting the free base with an acetone solution of methyl bromide, the di-quaternary salt, 1-ethyl-4-(4-diethylaminophenethyl)-piperidine di-methobromide, M. P. approximately 204°-205° C. after recrystallization from isopropanol, was obtained.

EXAMPLE 12

*1-ethyl-4-(4-di-n-hexylaminophenethyl)-piperidine*

12.5 g. of 1-ethyl-4-methyl-pyridinium iodide (Example 11), 14.5 g. of p-di-n-hexylaminobenzaldehyde (Example 7), 15 cc. of alcohol, and 2 cc. of piperidine were refluxed for 16 hours. The product, 1-ethyl-4-(4-di-n-hexylaminostyryl)-pyridinium iodide, after recrystallization from isopropanol, melted at approximately 150°-154° C.

27.5 g. of the latter product in 210 cc. of 95 per cent ethanol was reduced by catalytic hydrogenation in the presence of platinum oxide at 50° C. under 200 lbs. hydrogen pressure. The reaction mixture was worked up in the manner described in Examples 2 to 4. The product, 1-ethyl-4-(4-di-n-hexylaminophenethyl)-piperidine, had a B. P. of approximately 227°-231° C. at 0.5 mm. Hg.

The corresponding dihydrochloride was prepared by reacting 15.6 g. of the free base with 78 cc. of 1 N HCl.

EXAMPLE 13

*1-n-hexyl-4-(4-di-n-hexylaminophenethyl)-piperidine*

1-n-hexyl-4-methyl-pyridinium bromide (γ-picoline n-hexyl bromide) was prepared by heating 93 g. of γ-picoline with 139 g. of n-hexyl bromide at 135°-140° C. for 24 hours. After cooling, the unreacted starting materials were removed from the crystalline product by extraction with dry ether.

16 g. of 1-n-hexyl-4-methyl pyridinium bromide, 18 g. of p-di-n-hexyl-aminobenzaldehyde, 10 cc. of ethanol, and 1 cc. of piperidine were refluxed for 12 hours. The product obtained was 1-n-hexyl-4-(4-di-n-hexylaminostyryl)-pyridinium bromide.

15 g. of the latter product in 100 cc. of 95 per cent alcohol was subjected to catalytic hydrogenation at 40° C. under 200 lbs. hydrogen pressure in the presence of platinum dioxide. The reduction product isolated was 1-n-hexyl-4-(4-di-n-hexylaminophenethyl)-piperidine.

The dihydrochloride was prepared by reacting 15 g. of the base with approximately 65 cc. of 1 N HCl.

EXAMPLE 14

*1-n-hexyl-4-(4-diethylaminophenethyl)-piperidine*

129 g. of 1-n-hexyl-4-methyl-pyridinium bromide (Example 13), 89 g. of p-diethylaminobenzaldehyde, 250 cc. of ethanol, and 15 cc. of piperidine were refluxed for 21 hours. The product obtained, 1-n-hexyl-4-(4-diethylaminostyryl)-pyridinium bromide, after recrystallization from isopropyl alcohol, melted at 203°-207° C.

107 g. of the latter compound in 1000 cc. of 95 per cent alcohol was reduced catalytically in the presence of platinum dioxide at 50° C. under 200 lbs. hydrogen pressure. The product, 1-n-hexyl - 4-(4-diethylaminophenethyl)-piperidine, had a B. P. of approximately 221°–223° C. at 3 mm. Hg.

The dihydrochloride was prepared by reacting 10 g. of the free base with 58 cc. of 1 N HCl.

We claim:

1. A compound selected from the group consisting of 1-alkyl-2-dialkylaminophenethyl-piperidines, 1-alkyl-4-dialkylaminophenethyl-piperidines, and salts of these piperidines; each of the alkyl groups in said compound being a lower alkyl group.
2. A 1-alkyl-2-(4-dialkylaminophenethyl)-piperidine, each of the alkyl groups therein being a lower alkyl group.
3. A salt of a compound according to claim 2.
4. A 1-alkyl-4-(4-dialkylaminophenethyl)-piperidine, each of the alkyl groups therein being a lower alkyl group.
5. A salt of a compound according to claim 4.
6. 1 - methyl-2-(4-dimethylaminophenethyl)-piperidine.
7. 1 - n - hexyl-4-(4-diethylaminophenethyl)-piperidine.
8. 1 - methyl - 2 - (4-diethylaminophenethyl)-piperidine.
9. A salt of the compound of claim 8.
10. A salt of the compound of claim 8 which is an acid addition salt.
11. 1 - methyl - 2-(4-diethylaminophenethyl)-piperidine dihydrochloride.
12. 1 - ethyl-2-(4-diethylaminophenethyl)-piperidine.
13. A compound of the formula

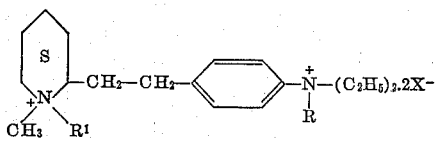

wherein R and R¹ are lower alkyl radicals having less than three carbon atoms per radical and X is the anion of a non-toxic acid.

14. 1 - ethyl - 2 - (4-diethylaminophenethyl)-piperidine di-ethiodide.

References Cited in the file of this patent

UNITED STATES PATENTS

| Number | Name | Date |
| --- | --- | --- |
| 2,355,659 | Lee et al. | Aug. 15, 1944 |

FOREIGN PATENTS

| Number | Country | Date |
| --- | --- | --- |
| 595,631 | Great Britain | Dec. 11, 1947 |

OTHER REFERENCES

Phillips, J. Org. Chem., vol. 12, pp. 333–41 (1947), abstracted: Chem. Abst. 41, 4489 (1947).

Phillips, J. Org. Chem., vol. 14, pp. 302–5 (1949), abstracted: Chem. Abst. 43, 7483 (1949).

Phillips, J. Am. Chem. Soc., vol. 72, pp. 1850–2 (1950), abstracted: Chem. Abst. 44, pp. 4964–4965 (1950).